N. M. FOWLER.
Plow, Harrow and Seed-Planter.
No. 208,082.                     Patented Sept. 17, 1878.
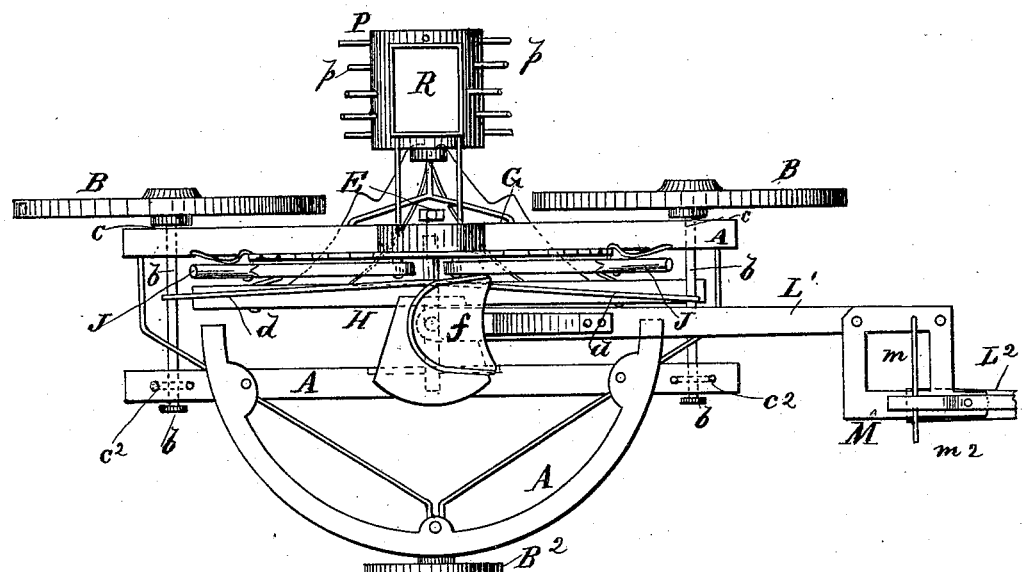
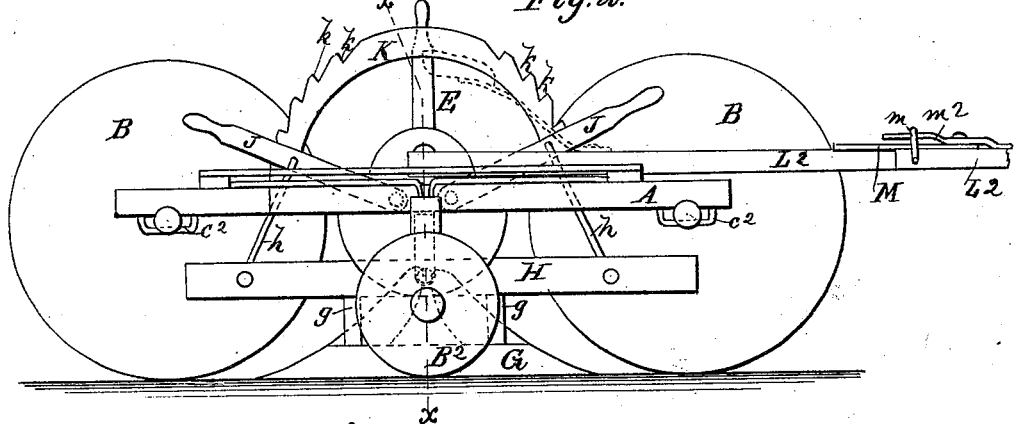
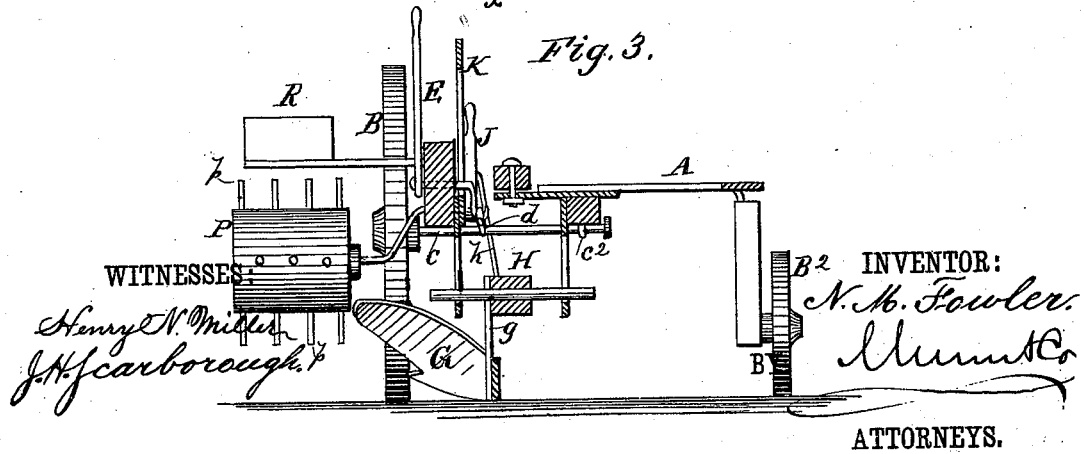

UNITED STATES PATENT OFFICE.

NELSON M. FOWLER, OF BELOIT, KANSAS.

IMPROVEMENT IN PLOW, HARROW, AND SEED-PLANTER.

Specification forming part of Letters Patent No. 208,082, dated September 17, 1878; application filed August 3, 1878.

*To all whom it may concern:*

Be it known that I, NELSON M. FOWLER, of Beloit, in the county of Mitchell and State of Kansas, have invented a new and useful Improvement in Combined Plow, Harrow, and Seed-Planter, of which the following is a specification:

My invention consists in a novel construction, arrangement, and combination of devices whereby provision is made for plowing in opposite directions and turning the team without turning the machine, for changing the direction of the wheels with relation to the plows, for adjusting the height of the plows, for harrowing the ground, and for planting seed, all as hereinafter more particularly described.

The accompanying drawing represents a combined double plow, harrow, and planter constructed according to my invention, Figure 1 being a top view, Fig. 2 a side view, and Fig. 3 a transverse vertical section taken in the line $x\ x$ of Fig. 2.

Similar letters of reference indicate corresponding parts.

The working parts of the apparatus are carried by a frame, A, which is mounted on three wheels, B B B$^2$, the two larger wheels, B B, being the furrow-wheels, and arranged in line with each other on one side of the frame, and the smaller wheel, B$^2$, being arranged on the opposite side of the frame, and intended to travel on the unplowed ground. The furrow-wheels B B are fixed to their axles $b\ b$, which revolve with them. Each wheel is attached to one end of its axle, which has its bearings in two horizontal rails which form part of the frame A, the wheel B being outside of the frame on one side, and the other end of the axle being provided with a flat head, which lies outside of the frame on the other side. One of the bearings of the axle $b$ is a ring or eye, $c$, and the other bearing is provided with an elongated loop or staple, $c^2$, serving as a keeper and holding it in place.

The two axles $b\ b$ are connected by rods $d\ d$ with the short arm of a hand-lever, E, which has its fulcrum in the frame A midway between said axles, and its long arm extending upward within convenient reach of the driver's seat $f$.

When the lever E stands upright the wheels are exactly in line with each other; but by moving the lever in either direction the axles $b\ b$ are oscillated in their ring or eye bearings $c$ as centers, so as to change the planes of rotation of the wheels and throw the plow to or from the land.

The plow G is of double construction, being provided with two shares or points and two mold-boards. The land-side may be in either one or two pieces, as preferred. This double plow is provided with two standards, $g\ g$, which are attached to a plow-beam, H. This plow-beam is connected by two rods, $h\ h$, near its ends, with two levers, J J, pivoted to the frame A, and extending upward and outward toward the two opposite ends of the frame. Each of the levers J is provided with a pawl, $i$, for engagement with ratchet-teeth $k$ in a curved bar, K, attached to the frame A. By raising either of the levers J the plow-point immediately under it is raised, so as to incline the plow and cause the opposite point to take deeper into the soil. By raising one lever and depressing the other the desired angles of inclination may be obtained. By raising both levers the entire plow may be raised clear of the ground. The engagement of the pawls $i$ and teeth $k$ holds the plow in position.

The double plow constructed and arranged as above described is made to work in opposite directions without turning the machine by means of a pivoted tongue, constructed and arranged as follows: The tongue is made in two sections, L$^1$ L$^2$, connected to each other by a metallic brace or frame, M. The rear end of the section L$^1$ is bolted or pivoted to the frame A at about its center, and to this section the driver's seat $f$ is attached. The metallic frame M is rigidly attached to the front end of the section L$^1$, and the rear end of the section L$^2$ is bolted or pivoted to said frame M. The section L$^2$ is provided with an elastic tongue or strip of metal, $m^2$, for engagement with a notch or depression in a rod or bar, $m$, on the frame M. When the tongue is in position for pulling the plow in either direction the two sections L$^1$ L$^2$ are in line with each other, and are so held by the engagement of the tongue $m^2$ and the notch or depression in the rod or bar $m$.

When the machine reaches the end of a furrow and is to travel in the opposite direction, the tongue $m^2$ is disengaged from the notch by the driver by means of a suitable foot-lever, and the front section is then free to turn at a right angle with the length of the rear section. By this means greater facility is afforded for reversing the tongue, as the team is enabled to pull with a direct lateral draft on the front end of the rear section after turning the front section on its bolt or pivot.

To the furrow side of the machine is attached a revolving harrow, consisting of a cylinder, P, provided with harrow-teeth $p$. The cylinder may be arranged to be rotated by a belt from one of the furrow-wheels B.

Immediately above the harrow is a seed-box, R, which may be provided with drill-tubes of suitable description.

The machine constructed as above described constitutes a combined double plow, harrow, and seed-planter, and will at one operation perform the work ordinarily performed at three operations by three different machines.

Having thus described my invention, I claim as new and desire to secure by Letters Patent—

1. The combination of the furrow-wheels B B, oscillating axles $b\ b$, rods $d\ d$, and lever E, substantially as and for the purpose shown and described.

2. The combination of the double plow G, plow-beam H, rods $h\ h$, levers J J, pawls $i\ i$, and toothed or notched bar K, substantially as and for the purposes herein described.

3. The combination, with the double plow and its carrying-frame and wheels, of the jointed tongue $L^1\ L^2$, metal frame M, tongue or strip $m^2$, and notched or recessed rod or bar $m$, as shown and described, for the purpose specified.

NELSON M. FOWLER.

Witnesses:
F. W. POUCHER,
DELIA FOWLER,
W. D. HAWLEY.